(12) United States Patent
Moyer et al.

(10) Patent No.: US 8,327,082 B2
(45) Date of Patent: *Dec. 4, 2012

(54) SNOOP REQUEST ARBITRATION IN A DATA PROCESSING SYSTEM

(75) Inventors: William C. Moyer, Dripping Springs, TX (US); Quyen Pho, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1107 days.

This patent is subject to a terminal disclaimer.

(21) Appl. No.: 12/201,225

(22) Filed: Aug. 29, 2008

(65) Prior Publication Data

US 2010/0057998 A1    Mar. 4, 2010

(51) Int. Cl.
*G06F 12/00*    (2006.01)

(52) U.S. Cl. ........ 711/146; 711/128; 711/141; 711/144; 711/145; 711/147; 711/151; 711/152; 710/107; 710/109; 710/110

(58) Field of Classification Search .......... 711/141–143, 711/128, 144, 145, 146–148; 710/107, 109, 710/112

See application file for complete search history.

(56) References Cited

U.S. PATENT DOCUMENTS

| | | | |
|---|---|---|---|
| 4,096,571 A | 6/1978 | Vander Mey | |
| 5,426,765 A | 6/1995 | Stevens et al. | |
| 5,506,971 A | 4/1996 | Gullette et al. | |
| 5,652,859 A * | 7/1997 | Mulla et al. | 711/146 |
| 5,893,151 A | 4/1999 | Merchant | |
| 5,920,892 A | 7/1999 | Nguyen | |
| 6,029,204 A | 2/2000 | Arimilli et al. | |
| 6,073,212 A | 6/2000 | Hayes et al. | |
| 6,175,930 B1 | 1/2001 | Arimilli et al. | |
| 6,253,291 B1 | 6/2001 | Pong et al. | |
| 6,594,734 B1 * | 7/2003 | Kyker et al. | 711/146 |
| 6,668,309 B2 | 12/2003 | Bachand et al. | |
| 6,907,502 B2 | 6/2005 | Augsburg et al. | |

(Continued)

FOREIGN PATENT DOCUMENTS
WO    9932976    7/1999

OTHER PUBLICATIONS

U.S. Appl. No. 11/969,112, filed Jan. 3, 2008.
U.S. Appl. No. 12/053,761, filed Mar. 24, 2008.
U.S. Appl. No. 12/112,796, filed Apr. 30, 2008.

(Continued)

*Primary Examiner* — Tuan Thai
*Assistant Examiner* — Zhuo Li
(74) *Attorney, Agent, or Firm* — Joanna G. Chiu; James L. Clingan, Jr.

(57) ABSTRACT

A snoop look-up operation is performed in a system having a cache and a first processor. The processor generates requests to the cache for data. A snoop queue is loaded with snoop requests. Fullness of the snoop queue is a measure of how many snoop requests are in the snoop queue. A snoop look-up operation is performed in the cache if the fullness of the snoop queue exceeds the threshold. The snoop look-up operation is based on a snoop request from the snoop queue corresponding to an entry in the snoop queue. If the fullness of the snoop queue does not exceed the threshold, waiting to perform a snoop look-up operation until an idle access request cycle from the processor to the cache occurs and performing the snoop look-up operation in the cache upon the idle access request cycle from the processor.

16 Claims, 7 Drawing Sheets

U.S. PATENT DOCUMENTS

| | | | |
|---|---|---|---|
| 7,818,511 B2 * | 10/2010 | Goodman et al. | 711/146 |
| 2003/0005236 A1 | 1/2003 | Arimilli et al. | |
| 2006/0004965 A1 * | 1/2006 | Tu et al. | 711/137 |
| 2006/0224835 A1 | 10/2006 | Blumrich et al. | |
| 2008/0294849 A1 * | 11/2008 | Uchida | 711/144 |
| 2010/0036984 A1 * | 2/2010 | Goodman et al. | 710/112 |

OTHER PUBLICATIONS

Office Action mailed Jun. 6, 2011 in U.S. Appl. No. 12/201,216.
Office Action mailed Jul. 5, 2011 in US Application No.
Notice of Allowance mailed Jul. 27, 2011 in US Application No.
U.S. Appl. No. 12/201,228.

\* cited by examiner

SNOOP REQUEST ARBITRATION IN A DATA PROCESSING SYSTEM

CROSS-REFERENCE TO RELATED APPLICATIONS

This application is related to Ser. No. 12/201,216, filed on even date, entitled "Cache Snoop Limiting Within a Multiple Master Data Processing System," naming William C. Moyer as inventor, and assigned to the current assignee hereof and Ser. No. 12/201,272, filed on even date, entitled "Snoop Request Arbitration in a Data Processing System", naming William C. Moyer and Quyen Pho as inventors, and assigned to the current assignee hereof.

BACKGROUND

1. Field

This disclosure relates generally to data processing systems, and more specifically, to cache coherency in a data processing system.

2. Related Art

Some data processing systems use multiple processors with closely coupled cache memories. A cache memory stores a subset of duplicative information that is stored in the system memory. Using a cache in the system may reduce the number of occurrences that a processor must communicate with the system memory via a system interconnect. However, the presence of various caches (or other memory devices) in a system can readily permit a data operand which has the same identifier or address to be present at various locations in the system. When the data operand is modified in one part of the system, an opportunity exists that an old version of the data operand will be stored or used. Memory coherency refers to the need of each processor in a multiple master data processing system to have access to the most recently modified data corresponding to a particular address in the memory system. The presence of differing data values for a same address value in a data processing system may lead to system errors.

To maintain memory coherency, reads and writes of information to the system memory are monitored or "snooped". When either a memory read or a memory write of data at an address is detected, this address of the transaction is used as a snoop address. A snoop request is initiated and directed to all caches in the system such that snoop lookups can be performed to search for any address in the caches that match the snoop address. A snoop hit occurs for every match, and any needed corrective action is taken to maintain coherency of the data at the address in the cache where the snoop hit occurs.

For a processor cache with a single set of tags, arbitration is needed between processor requests to search for addresses in its own cache (such as for performing a load or store instruction whose corresponding access address may be contained in the cache) and snoop requests to perform snoop lookups in the cache. In one arbitration solution used today, any pending snoop request blocks the processor from accessing its cache for one or more cycles. If snoop lookups occur frequently, then processor performance may be negatively impacted.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one embodiment, snoop requests, which are buffered in a snoop queue, are only performed when there is an idle processor cycle available or when a certain snoop queue fullness has been reached. This may allow a processor to have almost uninterrupted access to its cache, and may reduce the penalty of snoop look-ups. For example, the arbiter, which arbitrates requests to the cache from the processor and from the snoop queue, can monitor both processor requests to the cache and a fullness level of the snoop queue to decide when to handle queued snoop requests. Therefore, in one embodiment, until a predetermined number of snoop requests are buffered in the snoop queue, the processor is not stalled to process snoop requests. However, once the predetermined number is exceeded, the arbiter may elevate the priority of snoop queue entries above the processor requests until the snoop queue fullness has been reduced to the predetermined number or less. Note that this type of snoop protocol may be referred to as a lazy snoop protocol in which an immediate snoop lookup is not required when a snoop request is received.

Since a priority mechanism, such as the lazy snoop protocol described above, can alter priority between two requesters, it is possible for starvation of either requestor to occur. Therefore, in one embodiment, one or more counters are used to ensure that starvation of the processor or the snoop queue is avoided.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Figure 1:
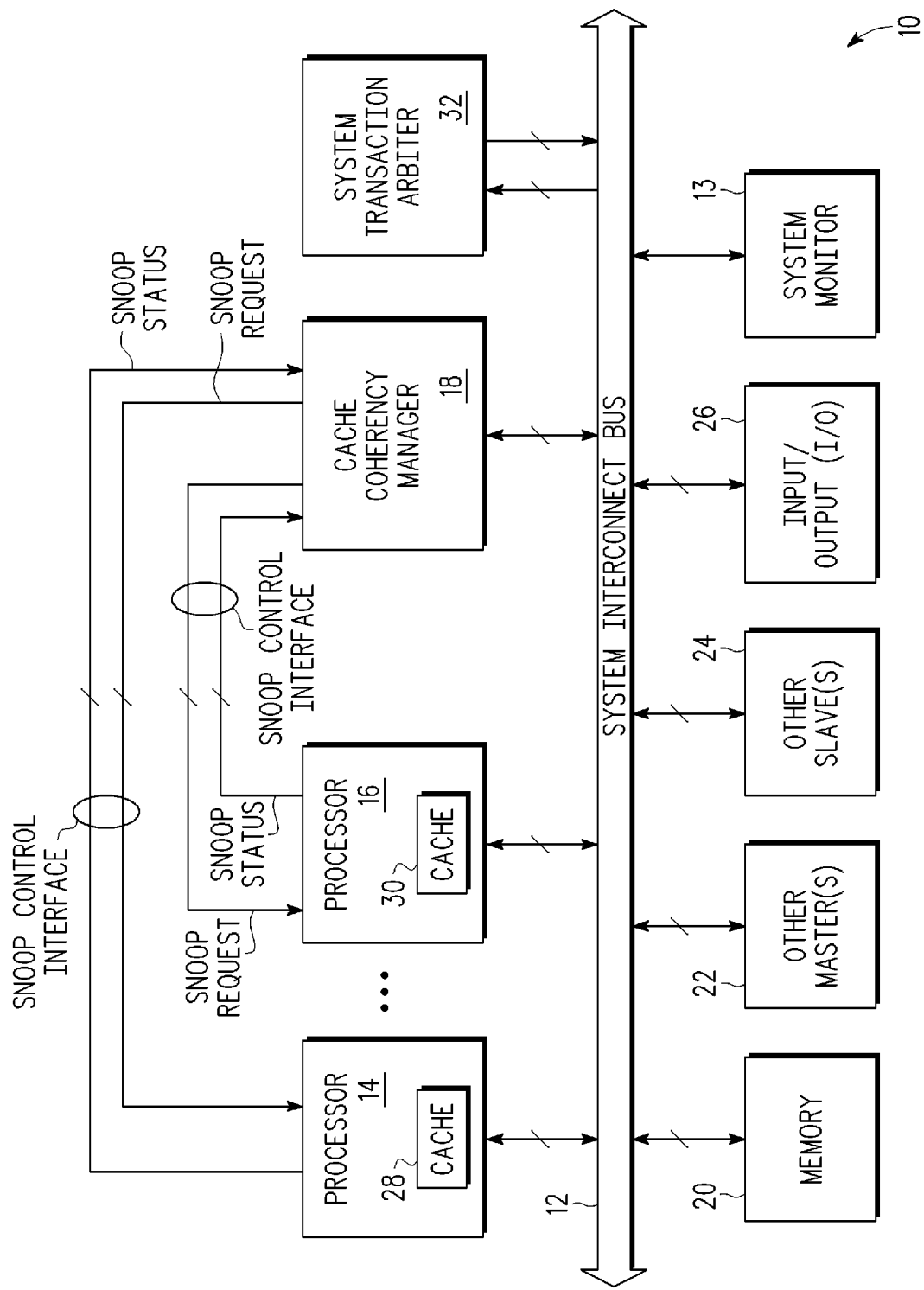
FIG. 1 is a block diagram of a data processing system according to one embodiment of the present invention.

FIG. 1 illustrates, in block diagram form, a data processing system 10 according to one embodiment of the present invention. Data processing system 10 includes processor 14, processor 16, cache coherency manager 18, system transaction arbiter 32, system memory 20, other master devices 22, other slave devices 24, input/output (I/O) devices 26, and a system monitor 13. The devices shown in FIG. 1 are communicatively coupled to a system interconnect bus 12 but maybe coupled by other types of system interconnects in other embodiments. For example, the devices shown may be communicatively coupled by a system interconnect that includes a cross bar switch or other type of switch, or a system interconnect that includes multiple busses and/or switches. In one embodiment, a system interconnect bus may include multiple signal lines for address, data, and control information.

System transaction arbiter 32 arbitrates among various masters of system 10 for transactions on a system interconnect bus 12. I/O devices 26 may be any number of I/O devices such as keyboard controllers and communications ports. Other slave devices 24 may include memory devices such as a system cache (e.g. L2 cache). Both devices 24 and 26 may be accessible by transactions on system interconnect bus 12 that are generated by the master devices of the system (e.g. processor 14, processor 16, or other master devices 22). In one embodiment, other master devices 22 includes other types of processors (e.g. a digital signal processor) or a direct memory access (DMA) device which can generate transactions on system interconnect bus 12. In one embodiment, each master device may also include a cache (not shown).

System 10 includes a cache coherency manager 18 that snoops system interconnect bus 12 for transactions and initiates snoop requests for various caches of system 10 (e.g. cache 28, cache 30) to determine whether the caches include the data operand (e.g. access address) of the transaction in order to maintain cache coherency. In one embodiment, if a cache contains a copy of the data operand, then that cache will invalidate the corresponding cache entry in response to the snoop request.

One example of a transaction is a write transaction by processor 16 to system memory 20 for writing data to a location in memory 20. In response to the transaction, cache coherency manager 18 would generate a snoop request to the other caches (e.g. cache 28) to search for data of the same memory address. If a cache has an entry corresponding to the same memory address, then the cache would invalidate that data since an updated version is being provided to memory 20 on system interconnect bus 12.

In the embodiment shown, system 10 includes a snoop control interface between the cache coherency manager 18 and each of the processors 14 and 16 for exchanging information regarding snooping operations. In the embodiment shown, the snoop control interface includes snoop request lines and snoop status. Alternate embodiments may include more or different lines within the snoop control interface. These lines will be discussed below. In the embodiment shown, cache coherency manager 18 only includes snoop control interfaces with processors 14 and 16. However, in other embodiments, cache coherency manager 18 may include a snoop control interface with other devices having a cache (e.g. master devices 22, slave devices 24, and other caches). In alternative embodiments, processors 14 and 16 may include additional caches.

In the illustrated embodiment, system 10 also includes a system monitor 13. System monitor 13 may be, for example, a performance monitor or a global throughput monitor. Any known performance monitor or global throughput monitor may be used, where information from system monitor 13 can be used, for example, by one or more masters on the bus to alter one or more parameters. Additional details of system monitor 13 will be discussed below.

In other embodiments, other types of data systems may include different configurations and/or have additional circuitry. Also, other embodiments may not have all of the circuitry shown in FIG. 1. In one embodiment, some or all of the circuitry shown in FIG. 1 may be implemented on one integrated circuit. However, in other embodiments, system 10 may be implemented with multiple integrated circuits.

In one embodiment, system 10 may be implemented as part of an information system such as e.g. a computer, cell phone, PDA, electronic control circuitry of an automobile, or other type of system implementing a data processing system.

Figure 2:
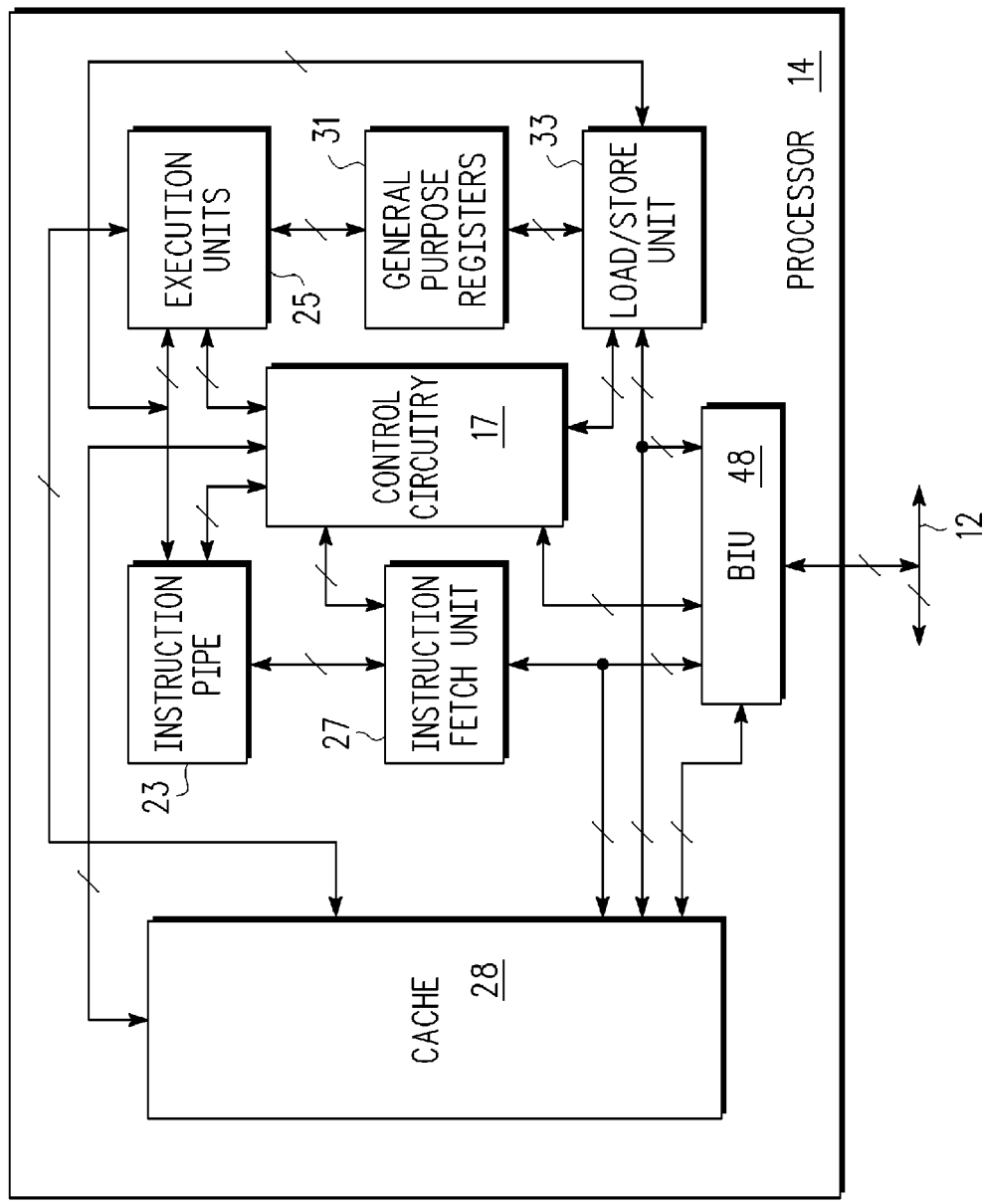
FIG. 2 is a block diagram of one embodiment of a portion of a processor according to one embodiment of the present invention.

Illustrated in FIG. 2 is a portion of processor 14 which further details the control circuitry within processor 14 between cache 28 and a bus interface unit (BIU) 48. Elements which are common with those of FIG. 1 are numbered the same in FIG. 2. BIU 48 is connected to system interconnect bus 12 and to cache 28 as previously described. A second input/output terminal of BIU 48 is connected to a fifth input/output terminal of cache 28 and to a first input/output terminal of instruction fetch unit 27. A third input/output terminal of BIU 48 is connected to a first input/output terminal of control circuitry 17. A fourth input/output terminal of BIU 48 is connected to a sixth input/output terminal of cache 28 and to a first input/output terminal of a load/store unit 33. A second input/output terminal of the instruction fetch unit 27 is connected to a first input/output terminal of an instruction pipe or instruction pipeline 23. A second input/output terminal of instruction pipeline 23 is connected to a first input/output terminal of execution units 25. Execution units 25 generally include units such as a floating point unit, an integer unit and other processing units. A third input/output terminal of instruction pipeline 23 is connected to a second input/output terminal of control circuitry 17. A third input/output terminal of instruction fetch unit 27 is connected to a third input/output terminal of control circuitry 17. A fourth input/output terminal of cache 28 is connected to a fourth input/output terminal of control circuitry 17. A fifth input/output terminal of control circuitry 17 is connected to a second input/output terminal of execution units 25. A third input/output terminal of execution units 25 is connected to the second input/output terminal of cache 28. A fourth input/output terminal of execution units 25 is connected to a first input/output terminal of general purpose registers (GPRs) 31. A second input/output terminal of general purpose registers 31 is connected to a second input/output terminal of load/store unit 33. A third input/output terminal of load/store unit 33 is connected to the second input/output terminal of instruction pipeline 23 and to the first input/output terminal of execution units 25. A fourth input/output terminal of load/store unit 33 is connected to a sixth input/output terminal of control circuitry 17.

In operation, control circuitry 17 of processor 14 functions to control and coordinate BIU 48 and cache 28 operations as well as the instruction fetch, decode and various execution units of processor 14. Under control of control circuitry 17, instructions are coupled via BIU 48 or cache 28 into the instruction fetch unit 27 and placed in the instruction pipeline 23. The instructions are executed by execution units 25 and results are stored off in GPRs 31. Load/store unit 33 operates under control of control circuitry 17 to load information needed for processing by execution units 25 from and to store information from GPRs 31 to cache 28 and/or system interconnect bus 12. Therefore, the portion of processor 14 detailed in FIG. 2 illustrates the instruction execution operation of processor 14 separate from the cache coherency management function. Various alternate embodiments of processor 14 may be implemented as well.

Figure 3:
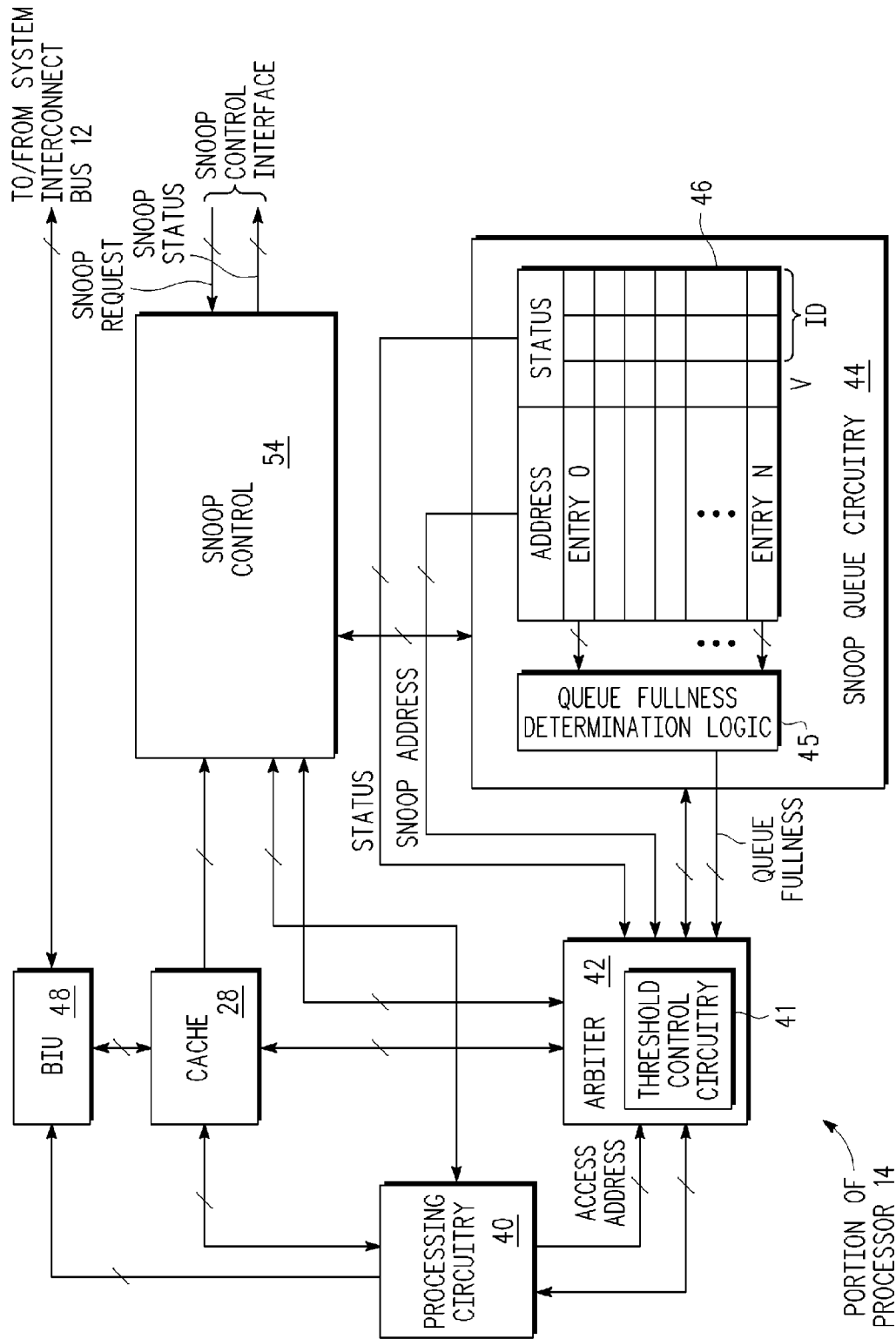
FIG. 3 is a block diagram of a portion of a cache according to one embodiment of the present invention.

Illustrated in FIG. 3 is further detail of a portion of processor 14 which further details cache 28 and associated cache snooping circuitry, in accordance with one embodiment of the present invention. Reference elements illustrated in FIG. 3 that are common with reference elements of FIGS. 1 and 2 are numbered the same. BIU 48 has a first input/output terminal connected via a bidirectional multiple-bit conductor to system interconnect bus 12. Processing circuitry 40 of processor 14 has a first output that is connected to an input of BIU 48. A second input/output terminal of BIU 48 is connected to a first input/output terminal of cache 28. A second input/output terminal of cache 28 is connected via a bidirectional multiple-bit conductor to a first input/output terminal of processing circuitry 40. A third input/output terminal of cache 28 is connected via a bidirectional multiple-bit conductor to a first input/output terminal of an arbiter 42. A fourth input/output terminal of cache 28 is connected to a first input/output terminal of snoop control 54. A second output of processing circuitry 40 is connected to a first input of arbiter 42 for providing an access address. A second input/output terminal of processing circuitry 40 is connected to a second input/output terminal of arbiter 42. Snoop control 54 has a second input/output terminal connected to a third input/output terminal of the arbiter 42. A third input/output terminal of snoop control 54 is connected to a third input/output terminal of processing circuitry 40. An output of snoop control 54 provides a snoop status signal, and an input of snoop control 54 receives a snoop request signal, both of which may be considered part of the snoop control interface. Snoop queue circuitry 44 has a first output connected to a second input of arbiter 42 for providing a snoop address from the stored (N+1) entries. A second output of snoop queue circuitry 44 is connected to a third input of the arbiter 42 for providing status information associated with each snoop address. This status information may be provided to indicate that the current snoop address is valid and that a request for snoop lookup to arbiter 42 is valid. A fourth input/output terminal of the arbiter 42 is connected to a first input/output terminal of snoop queue circuitry 44 for providing access control. This access control is used to handshake snoop requests and snoop grants and coordinates the operation of the snoop queue circuitry 44. A fourth input/output terminal of snoop control 54 is connected to a second input/output terminal of snoop queue circuitry 44 for providing snoop addresses and other snoop request information from the system interconnect 12 to the snoop queue circuitry 44. A third output of snoop queue circuitry 44 is connected to a fourth input of arbiter 42 for providing a queue fullness indicator signal. Snoop queue circuitry 44 includes a snoop queue 46 coupled to queue fullness determination logic 45.

Processing circuitry 40 may include circuitry typically found in a processor such as e.g. an instruction pipe unit, execution units, an instruction fetch unit, control circuitry, general purpose registers, a load store unit, and a prefetch unit. For example, in one embodiment, processing circuitry 40 may include instruction pipe 23, instruction fetch unit 27, control circuitry 17, execution units 25, GPRs 31, and load/store unit 33, of FIG. 2. Processors of other embodiments may include other types of circuitry.

In one embodiment, during processor operations, processing circuitry 40 executes instructions that generate requests for data to be read from system memory 20 (or other slave or I/O devices) and for data to be written to system memory 20 (or other slave or I/O devices). In response to a request for data having a system memory address (e.g. generated by load/store unit 33 or instruction fetch unit 27) processing circuitry 40 will check cache 28 (via arbiter 42) to see if it has any data that corresponds to that system memory address. If not, load/store unit 33 of processing circuitry 40 may generate via BIU 48 a transaction on system interconnect bus 12 to request data from memory 20 at that system address. In response to the read transaction, the system memory 20 will provide the requested data on system interconnect bus 12 to processor 14 where BIU 48 receives the data and provides the data to processing circuitry 40 and to cache 28 in some embodiments. After receiving the data by processor 14, the transaction is completed. Write transactions to memory 20 can be initiated by processor 14 where a write address and data are provided on interconnect bus 12 to be written to memory 20 at the address, and may also be written to cache 28. Also, data may be written to or read from other slave devices 24 and I/O devices 26 of data processing system 10 in other embodiments.

Cache 28 may be an instruction cache, a data cache, or a combination of the two. The use of the term "data" herein in regards to a transaction may refer to the information stored in either an instruction cache or a data cache.

Processor 14 also includes circuitry for snoop request management. The snoop request circuitry operates to keep the data in cache 28 coherent with other copies of the data stored in memory 20 and other caches of data processing system 10. Snoop control 54 receives snoop requests from cache coherency manager 18 via the snoop control interface. Processor 14 includes snoop queue circuitry 44 including snoop queue 46 for storing snoop requests received from the snoop control interface. In one embodiment, snoop request queue 46 may be implemented as a first-in first-out buffer (FIFO). In one embodiment, the FIFO may be implemented as a circular buffer.

Within snoop request queue 46 is a plurality of (N+1) entries where N is an integer. Each entry in snoop request queue 46 has an address field and a status field that includes status information. The address field stores the address of the transaction for which a snoop request was generated. In the embodiment shown, a first status bit is a valid (V) bit which indicates whether the entry in snoop request queue 46 is valid. Other types of status bits may be included in other embodiments. Each entry also includes a snoop request ID field that stores a snoop request ID for the snoop request generated by the cache coherency manager.

Within snoop queue circuitry 44, coupled to snoop request queue 46, is queue fullness determination logic 45. Queue fullness determination logic 45 is coupled to each entry of snoop request queue 46 so that it can determine a fullness of snoop request queue 46. In one embodiment, the fullness of snoop request queue 46 is a measure of how many valid snoop requests are currently present in snoop request queue 46. Therefore, in the illustrated embodiment, queue fullness determination logic 45 provides a queue fullness indicator to arbiter 42 which indicates how full snoop request queue 46 is.

In operation, snoop control 54 and snoop queue circuitry 44 operate to keep cache 28 coherent with other copies of the information in system 10. Snoop control 54 receives a snoop request from cache coherency manager 18 via the snoop control interface and provides the address of the snoop request, along with the request ID to be stored in snoop request queue 46. Therefore, in one embodiment, cache coherency manager 18 may be characterized as detecting possible incoherencies caused by at least one transaction between a processor and system memory 20 or within a processor and a cache. The snoop requests provided by cache coherency manager 18 to snoop control 54 may therefore arise from these possible incoherencies. In an alternate embodiment, the functionality of cache coherency manager 18 may be distributed within the different masters of system 10. For example, the functions may be performed within each of the processors 14-16.

Arbiter 42 arbitrates access to cache 28 between the processing circuitry 40 and snoop queue circuitry 44 in an efficient manner to minimize the time that processing circuitry 40 does not have access to cache 28. This minimization may be accomplished in one embodiment, by performing arbitration based on idle cycles of processing circuitry 40 or based on idle cycles as well as a fullness of snoop request queue 46, as will be discussed further below and with respect to FIG. 4.

When a snoop request is received by snoop control 54, snoop control 54 routes the snoop address to the snoop queue circuitry 44. Various embodiments of the function of snoop queue circuitry 44 may be implemented. In one embodiment, all received snoop addresses from snoop control 54 are stored in snoop request queue 46. When arbiter 42 provides snoop queue circuitry 44 with access to cache 28, access addresses from the processing circuitry 40 are not permitted to cache 28 via arbiter 42. In this mode of operation, arbiter 42 provides the snoop addresses from snoop request queue 46 to cache 28 for searching (i.e. for performing a snoop lookup operation). The snoop addresses are removed from the snoop request queue 46 on a first-in, first-out (FIFO) basis.

When a snoop address is present in snoop request queue 46, snoop queue circuitry 44 signals arbiter 42 to request arbiter 42 to arbitrate for access to cache 28. In one embodiment, cache 28 has a single set of address tags and therefore must be either be dedicated to the processor (i.e. processing circuitry 40) for addressing or to snoop queue circuitry 44 for addressing. When arbiter 42 prevents access by processing circuitry 40 to cache 28, snoop addresses from circuitry 44 are routed through arbiter 42 to cache 28. Circuitry within cache 28 performs a snoop look-up operation. The snoop-lookup operation includes comparing the snoop address with all the addresses presently stored in cache 28. In one embodiment, if a match occurs, the matching entry in cache 28 is marked as invalid since it is potentially different from the entry of the transaction on system interconnect bus 12. If no match occurs, no further action is taken within cache 28. The hit determination, and the invalidating of the matching entry if a hit does occur may also be referred to as part of the snoop look-up operation. In some embodiments, snoop control 54 may signal arbiter 42 to arbitrate for access to cache 28.

Therefore, arbiter 42 arbitrates access to cache 28 between access addresses from processing circuitry 40 and snoop addresses from snoop queue circuitry 44. In one embodiment, processing circuitry 40 may signal to arbiter 42 for the need to access cache 28 by simply providing an access address to arbiter 42, which operates as a processing circuitry request for access to cache 28. Alternatively, a separate processing circuitry request signal may be provided from processing circuitry 40 to arbiter 42 to request access to cache 28 for a current access address. Similarly, in one embodiment, snoop queue circuitry 44 may signal to arbiter 42 for the need to access cache 28 by simply providing a snoop address to arbiter 42. Alternatively, a separate snoop circuitry access request signal may be provided from snoop queue circuitry 44 to arbiter 42 to request access to cache 28 for a current snoop address corresponding to a next snoop request in snoop request queue 46.

In one embodiment, arbiter 42 selects priority between an access address and a snoop address for accessing cache 28 based on idle cycles of processing circuitry 40 and on a fullness of snoop request queue 46. In one embodiment, arbiter 42, using the queue fullness signal from queue fullness determination logic 45, determines whether or not fullness of queue 46 exceeds a predetermined fullness threshold. In one embodiment, this determination is made by threshold control circuitry 41 within arbiter 42. The fullness threshold may be stored within threshold control circuitry 41 or anywhere within system 10. In one embodiment, the fullness threshold is programmable such that it may be dynamically changed during operation of processor 14. If the fullness of queue 46, as indicated by the queue fullness signal, exceeds the fullness thresholds, arbiter 42 grants access to the snoop address, thus providing the snoop address corresponding to a next snoop request from the queue 46 to cache 28 such that a snoop look-up operation based on that next snoop request can be performed. However, if the fullness of queue 46 does not exceed the fullness threshold and there is at least one snoop request in queue 46 waiting to be processed, arbiter 42 may wait to perform a snoop look-up operation for a next snoop request in queue 46 until an idle access request cycle occurs from processing circuitry 40 to cache 28 occurs. That is, so long as the fullness of queue 46 does not exceed the fullness threshold, snoop addresses corresponding to snoop requests stored in queue 46 are only processed (i.e. provided to cache 28 for a snoop look-up operation) if there is an idle access request cycle from processing circuitry 40. In this manner, snoop look-up operations do not hinder the efficiency of processing circuitry 40, unless queue 46 has reached a certain level of fullness. Operation of arbiter 42 will be discussed in further detail with respect to the timing diagram of FIG. 4 below.

In another embodiment, arbiter 42 may not base its decision on the fullness of queue 46 and may always wait for an idle access request cycle from processing circuitry 40 for allowing access of a snoop address to cache 28. Note that an idle access request cycle (or an idle cycle) may refer to any clock cycle in which processing circuitry 40 does not have a pending access address requiring access to cache 28. An active cycle may refer to any clock cycle in which processing circuitry 40 requires access to cache 28, or to any clock cycle which is not considered an idle cycle.

In the embodiment shown in FIG. 3, the snoop control interface includes a snoop request signal interface and a snoop status signal interface. Alternatively, other or different signals may be included, such as, for example, a snoop acknowledgement signal interface, a snoop error signal interface, etc.

In one embodiment, the snoop request signal interface includes a request signal line for indicating that a snoop request is being made, a snoop command line indicating the type of bus transaction that generated the snoop, a snoop address line which is the address of the transaction being snooped, and a snoop request ID line, which is a number generated by the cache coherency manager identifying the snoop request. These signal lines may be multi-bit (either in parallel or serial in some embodiments) or single bit in some embodiments.

The snoop status signal interface is used to indicate to the cache coherency manager 18 that a snoop request has been processed by the cache and the result of the cache snoop (e.g. whether an entry for the data address was found in the cache or not or whether an error (parity or other error type) was found with the data of the entry). In one embodiment, the snoop status interface includes a snoop response line and a snoop request ID line indicating the ID number of the snoop request. These lines may be multi-bit as well.

In other embodiments, system 10 may include processors of other configurations and/or that perform transactions and snoop operations in a different manner. For example, a processor may have other circuitry not shown in FIG. 3 or may not include all of the circuitry shown in FIG. 3. Also, a processor may include other circuitry for handling snoop requests in another manner as well, rather than by invalidation of matching cache entries.

Figure 4:
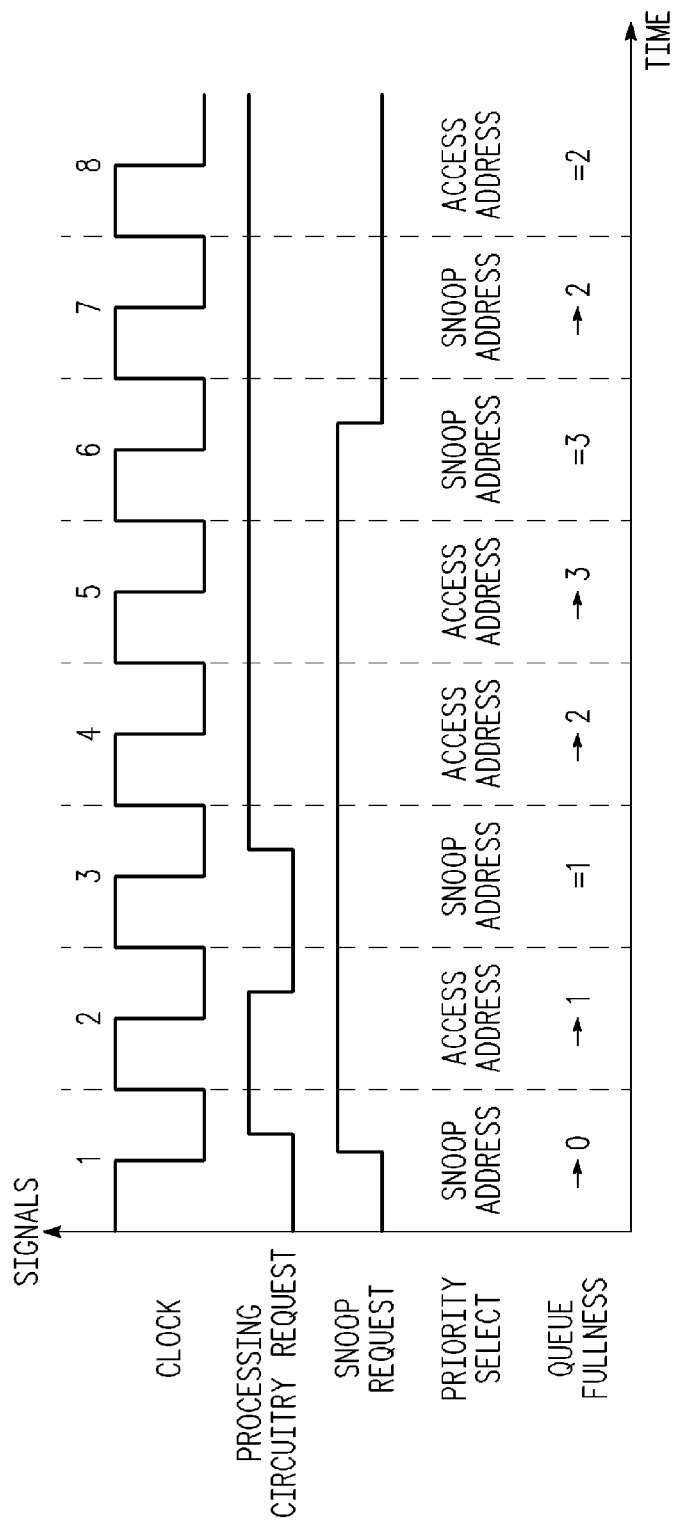
FIG. 4 is a timing diagram according to one embodiment of the present invention.

FIG. 4 illustrates, in timing diagram form, operation of a portion of the circuitry of FIG. 3, in accordance with one embodiment of the present invention. For the example of FIG. 4, it is assumed that the fullness threshold is set to 2. Initially, in cycle 1 of FIG. 5, there is no processing circuitry request, thus cycle 1 is considered an idle cycle. Therefore, the priority selection by arbiter 42 selects the snoop address provided by snoop queue circuitry 44 (assuming there is a valid snoop request in queue 46) to arbiter 42 to provide to cache 28. If there was a valid snoop request in queue 46, this snoop request is processed by cache 28 since arbiter 42 selects the snoop address for provision to cache 28. The queue fullness, in cycle 1, therefore transitions (indicated by "→") to 0 since a snoop request was removed from queue 46 and processed. Later in cycle 1 of FIG. 4, processing circuitry 14 makes a processing circuitry request, requesting access to cache 28 in the next cycle. That is, as discussed above, processing circuitry 14 may provide an access address to arbiter 42, which operates as the processing circuitry request, or may provide a separate request signal to arbiter 42. Also, later in cycle 1, a snoop request is received via snoop control interface by snoop control 54 for storage into snoop request queue 46.

Therefore, since a processing circuitry request is present for cycle 2, it is not an idle cycle. Furthermore, at the start of cycle 2, queue 46 included no snoop requests; therefore queue 46 has not yet exceeded the fullness threshold. In cycle 2, arbiter 42 selects the access address from processing circuitry 40 as having priority and thus provides this access address to cache 28. Also, in cycle 2, the snoop request remains asserted indicating that another snoop request is received in cycle 2. This snoop request is received by snoop control 54 and stored into queue 46 at the beginning of cycle 3. Since a snoop request was received in cycle 1 via snoop control interface by snoop control 54 for storage into snoop request queue 46 at the beginning of cycle 2, in cycle 2, the fullness of queue 46 transitions from 0 to 1. Later in cycle 2, the processing circuitry request is negated, indicating that no processing circuitry request is being made for cycle 3.

At the start of cycle 3, there is no processing circuitry request; therefore, arbiter 42 selects the snoop address corresponding to the next snoop request to be processed from queue 46 to provide to cache 28 during this idle cycle. The snoop request remains asserted, indicating that another snoop request is received in cycle 3. Therefore, since one snoop request was processed by providing it to cache 28, and a new snoop request was received, the fullness of queue 46 remains (as indicated by the "=") at 1. Later in cycle 3, the processing circuitry request is again asserted, indicating an active cycle for cycle 4.

In cycle 4, both a processing circuitry request is present and a snoop address from queue 46 is available. However, since queue 46 has not exceeded the fullness threshold of 2, arbiter 42 selects the access address corresponding to the processing circuitry request to provide to cache 28. However, since in cycle 4, the snoop request from cycle 3 is placed in queue 46, the fullness of queue 46 increases (i.e. transitions) to 2.

In cycle 5, both a processing circuitry request is present and a snoop address from queue 46 is available. However, as in cycle 4, queue 46 has not yet exceeded the fullness threshold of 2. Therefore, arbiter 42 again selects the access address corresponding to the processing circuitry request to provide to cache 28. However, a snoop request is again loaded into queue 46 at the beginning of cycle 5 due to the asserted snoop request in cycle 4, therefore, the fullness of queue 46 transitions to 3 in cycle 5, which does exceed the fullness threshold of 2.

In cycle 5, although a processing circuitry request is present for cycle 6, and thus is an active cycle, the fullness of queue 46 has exceeded the fullness threshold of 2. Therefore, arbiter 42 selects the snoop address corresponding to a next snoop request to be processed from queue 46 to provide to cache 28 for a snoop look-up operation in cycle 6. Since both a snoop request is processed from queue 46 and a new snoop request for storage into queue 46 is again received, in cycle 6, the fullness of queue 46 remains at 3, which still exceeds the fullness threshold of 2. Later in cycle 6, the snoop request is negated, indicating that a snoop request is not being received by snoop control 54.

In cycle 6, there is still a processing circuitry request present and thus is an active cycle; however, the fullness of queue 46 still exceeds the fullness threshold of 2. Therefore, arbiter 42 selects the snoop address corresponding to a next snoop request to be processed from queue 46 to provide to cache 28 for a snoop look-up operation in cycle 7. In this cycle, a snoop request is processed from queue 46 but no new snoop request is received by snoop control 54; therefore, the fullness of queue 46 transitions down to 2, which no longer exceeds the fullness threshold.

In cycle 7, there is still a processing circuitry request present and since the fullness of queue 46 no longer exceeds the fullness threshold, arbiter 42 selects the access address corresponding to the processing circuitry request to provide to cache 28 for a lookup in cycle 8. Since no snoop request is received in cycle 7, the fullness of queue 46 remains at 2.

Therefore, in one embodiment, a request between processor 14 (e.g. processing circuitry 40) and cache 28 can be detected by arbiter 42, where arbiter 42 can provide a snoop address to cache 28 for a snoop look-up operation if the detected request corresponds to an idle request (i.e. corresponds to an idle cycle with no access address present) and not provide the snoop address to cache 28 if the request is a processing circuitry request with a corresponding access address. In the latter case, arbiter 42 may provide the access address to cache 28 and then provide the snoop address to cache 28 if a next request detected between processing circuitry 40 and cache 28 is an idle request (i.e. corresponds to an idle cycle with no access address present).

Therefore, it can now be understood how arbiter 42 can bias priority for access to cache 28 towards processing circuitry 40, so as not to negatively impact the performance of processor 14, while still ensuring that the snoop queue circuitry 44 does not stall operation due to an overflow in queue 46. By waiting for idle cycles to perform snoop look-up operations, efficiency of processor 14 may be improved. However, by allowing snoop look-up operations to be performed once a certain number of snoop requests are pending, regardless of whether there is an idle or active cycle, stalls due to an overflow of snoop requests may also be avoided.

Figure 5:
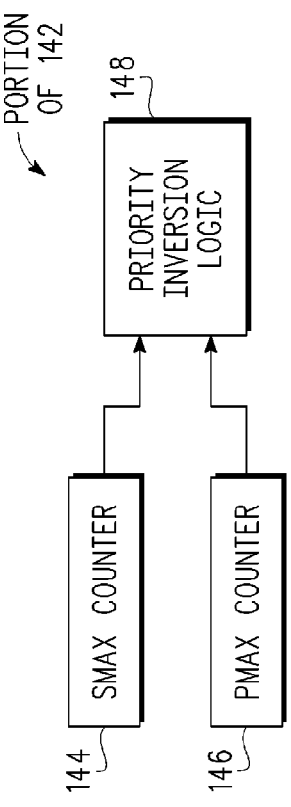
FIG. 5 illustrates a block diagram of a portion of an arbiter which may be used for the arbiter of FIG. 3 in accordance with one embodiment of the present invention.

FIG. 5 illustrates a block diagram of a portion of an arbiter 142 which may be used as arbiter 42 of FIG. 3. That is, arbiter 142 operates the same as arbiter 42 with the addition of the elements illustrated in FIG. 5; therefore, except to the extent described differently in reference to FIGS. 5 and 6, the descriptions provided above with respect to arbiter 42 also apply to arbiter 142. That is, arbiter 142 may be the same as arbiter 42 but with additional capabilities.

The portion of arbiter 142 illustrated in FIG. 5 includes a snoop starvation counter 144 (also referred to as Smax counter 144), a processing circuitry starvation counter 146 (also referred to as Pmax counter 146), and priority inversion logic 148. In operation, the starvation counters may be used to prevent starvation of either pending accesses from processing circuitry 40 or of pending snoop requests from snoop queue 46 from accessing cache 28. In one embodiment, counter 146 keeps track of the number of cycles an access address from processing circuitry 40 has been pending because it is unable to gain access to cache 28 due to arbiter 142 selecting snoop addresses from snoop queue 46 to provide to cache 28 (which, in the case of both an access address pending from processing circuitry 40 and a snoop address pending from snoop queue 46, occurs when the queue fullness is at or above the fullness threshold level, in accordance with the lazy protocol described above). In one embodiment, counter 146 is set to a maximum value, Pmax, the first time a pending access address from processing circuitry 40 is not granted access to cache 28 by arbiter 142. For each subsequent cycle that this access address is still pending (still waiting to be granted access to cache 28), counter 146 is decremented. When counter 146 expires, arbiter 142 will grant priority to the pending access address from processing circuitry 40 for a predetermined number of cycles, thus preempting any valid snoop requests from snoop queue 46. In one embodiment, the predetermined number of cycles is only one cycle. In one embodiment, counter 146 may be reloaded with Pmax whenever a pending access address from processing circuitry 40 is granted access to cache 28 by arbiter 142. Therefore, priority inversion logic 148 can monitor counter 146 to determine when it has expired, and, in response thereto, cause arbiter 142 to invert the priority to select the pending access address for one or more cycles (even though the queue fullness of snoop queue 46 is at or above the fullness threshold level). In this manner, an access request from processing circuitry 40 may be performed (i.e. provided to cache 28) in response to a consecutive number of snoop look-up operations exceeding a limit (e.g. Pmax). That is, in one embodiment, such as when cache operations are pipelined, each time counter 146 is decremented, it can be assumed that a snoop look-up operation is performed (where the snoop look-up operation is performed in response to the snoop request which was provided to cache 28).

In one embodiment, counter 144 keeps track of the number of cycles a valid snoop address from snoop queue 46 has been pending because it is unable to gain access to cache 28 due to arbiter 142 selecting access addresses from processing circuitry 40 to provide to cache 28 (which, in the case of both an access address pending from processing circuitry 40 and a snoop address pending from snoop queue 46, occurs when the queue fullness is below the fullness threshold level, in accordance with the lazy protocol described above). In one embodiment, counter 144 is set to a maximum value, Smax, the first time a valid snoop request (i.e. a pending snoop request) from snoop queue is not granted access to cache 28 by arbiter 142. For each subsequent cycle that this snoop request remains pending (still waiting to be granted access to cache 28 by arbiter 142), counter 144 is decremented. When counter 144 expires, arbiter 142 will grant priority to the pending snoop address from snoop queue 46 for a predetermined number of cycles, thus preempting any pending access addresses by processing circuitry 40. In one embodiment, the predetermined number of cycles is only one cycle. Counter 144 may be reloaded with Smax whenever a pending snoop address from snoop queue 46 is granted access to cache 28 by arbiter 142. Therefore, priority inversion logic 148 can monitor counter 144 to determine when it has expired, and, in response thereto, cause arbiter 142 to invert the priority to select the pending snoop request for one or more cycles (even though the queue fullness of snoop queue 46 is below the fullness threshold level). In this manner, a pending snoop request from snoop queue 46 may be processed (i.e. provided to cache 28) in response to a consecutive number of access addresses from processing circuitry 40 (i.e. processor requests) being processed exceeding a limit (e.g. Smax). That is, in one embodiment, such as when cache operations are pipelined, each time counter 144 is decremented, it can be assumed that an access address from processing circuitry 40 is processed (where the access address is processed by being provided to cache 28).

Therefore, when there is both a pending access address from processing circuitry 40 and a pending snoop address from snoop queue 46, arbiter 142 may further use the starvation counters, in addition to the fullness of snoop queue 46, to arbitrate this contention. That is, if both an access address and a snoop address are pending and the snoop queue fullness is at or greater than the fullness threshold, arbiter 142, based on the expiration of starvation counter 146 (i.e. based on Pmax) may select the pending access address and thus pre-empt the pending snoop address. Similarly, if both an access address and a snoop address are pending and the snoop queue fullness is below the fullness threshold, arbiter 142, based on the expiration of starvation counter 144 (i.e. based on Smax) may select the pending snoop address and thus pre-empt the pending access address. This may ensure that snoop queue 46 does not hold a snoop request for an unbounded time and may likewise ensure that processing circuitry 40 can make forward progress when overloaded with snoop queue traffic requests.

Note that in alternate embodiments, rather than loading counters 144 and 146 with Smax and Pmax, respectively, and detecting their expiration to invert the priority, counters 144 and 146 may be cleared to zero and incremented for each subsequent cycle the corresponding access address or snoop address remains pending until the value of Pmax or Smax, respectively, is reached in order to invert the priority.

Figure 6:
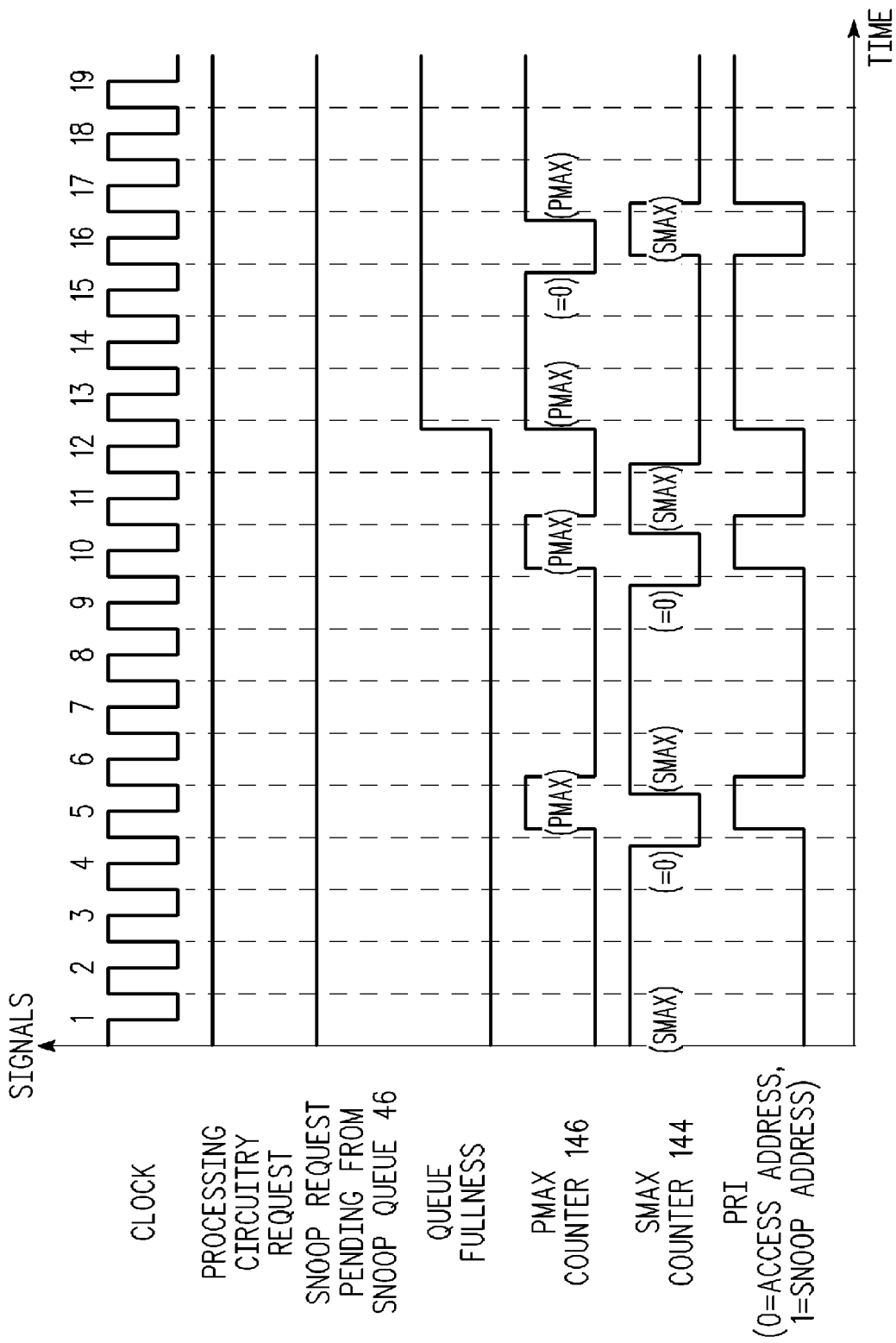
FIG. 6 illustrates a timing diagram according to one embodiment of the present invention.

FIG. 6 illustrates a timing diagram which describes operation of a portion of FIG. 3 along with the portion of arbiter 142 of FIG. 5 in accordance with one embodiment. Note that when the Pmax counter signal illustrated in FIG. 6 is asserted, it indicates that counter 146 is counting (e.g. decrementing) and when the Smax counter signal is asserted, it indicates that counter 144 is counting (e.g. decrementing). In one embodiment, in each cycle in which counter 146 or 144 is not counting (e.g. decrementing), it is being loaded with the value of Pmax or Smax, respectively. In clock cycle 1, both a processing circuitry request from processing circuitry 40 is pending and a snoop request from snoop queue 46 is pending; therefore, there is contention in that arbiter 142 has to prioritize between the two pending requests. Since the queue fullness of snoop queue 46 is below the threshold (as indicated by the negation of "queue fullness"), then, according to the lazy snoop protocol described above in reference to FIGS. 3 and 4, arbiter 142 gives priority to processing circuitry 40 (provides the pending access address to cache 28). Note that when the priority signal, PRI, in FIG. 6 is negated, it indicates that the access address from processing circuitry 40 is given priority and when asserted, it indicates that the snoop address from snoop queue 46 is given priority. Since a pending snoop request has been denied access to cache 28, counter 144 is loaded with Smax and will continue to decrement each cycle for which the pending snoop request is still denied access. Note that since the queue fullness remains below the threshold, arbiter 142 continues to grant access to processing circuitry 40, and for each cycle, such as cycles 2-4, counter 144 continues to decrement. In cycle 4, it is assumed that counter 144 has expired. Therefore, for cycle 5, arbiter 142 grants access to the pending snoop address (as indicated by the assertion of PRI for one cycle), thus pre-empting the next pending access address from processing circuitry 40 (since the queue fullness would typically indicate that priority should be granted to the pending access address from processing circuitry 40).

During cycle 5, since priority is granted to the snoop address and thus the pending access address from processing circuitry 40 is denied access to cache 28, counter 146 may be loaded with Pmax. However, in the current embodiment, priority is inverted for only one cycle, therefore, in cycle 6, priority is returned to processing circuitry 40 (as indicated by the negation of PRI). Note that again, in cycle 10, priority is inverted for one cycle from processing circuitry 40 to snoop queue 46. In this manner, snoop queue 46 is not completely starved during the contention of pending processing circuitry requests and pending snoop requests.

At the end of cycle 12, note that the queue fullness reaches the fullness threshold (as indicated by the assertion of "queue fullness"). Therefore, as indicated by the lazy protocol described above, arbiter 142 grants priority to the snoop address from snoop queue 46. However, since there is still a pending processing circuitry request, counter 146 is loaded with Pmax and decremented for each cycle for which access to cache 28 is denied to the pending processing circuitry request. Therefore, counter 146 is decremented in each of cycles 13-15, at which point it expires. Therefore, note that in cycle 16, priority is given to the pending processing circuitry request, thus preempting the pending snoop address from snoop queue 46. In cycle 16, since priority is granted to the access address and thus the pending snoop address from snoop queue 46 is denied access to cache 28, counter 144 may be loaded with Smax. However, in the current embodiment, priority is inverted for only one cycle, therefore, in cycle 17, priority is returned to snoop queue 46 (as indicated by the assertion of PRI). In this manner, processing circuitry 40 is also not completely starved during the contention of pending processing circuitry requests and pending snoop requests.

Note that the values of Pmax and Smax used in the embodiment of FIGS. 5 and 6 can be hardwired values or programmable. In one embodiment, they may be dynamically changed in response to operation of system 10. For example, in one embodiment, based on information provided by system monitor 13, such as performance or throughput information, the values of Pmax or Smax or both can dynamically be changed, in order to attempt to optimize a level of snoop or processor throughput or performance.

Figure 7:
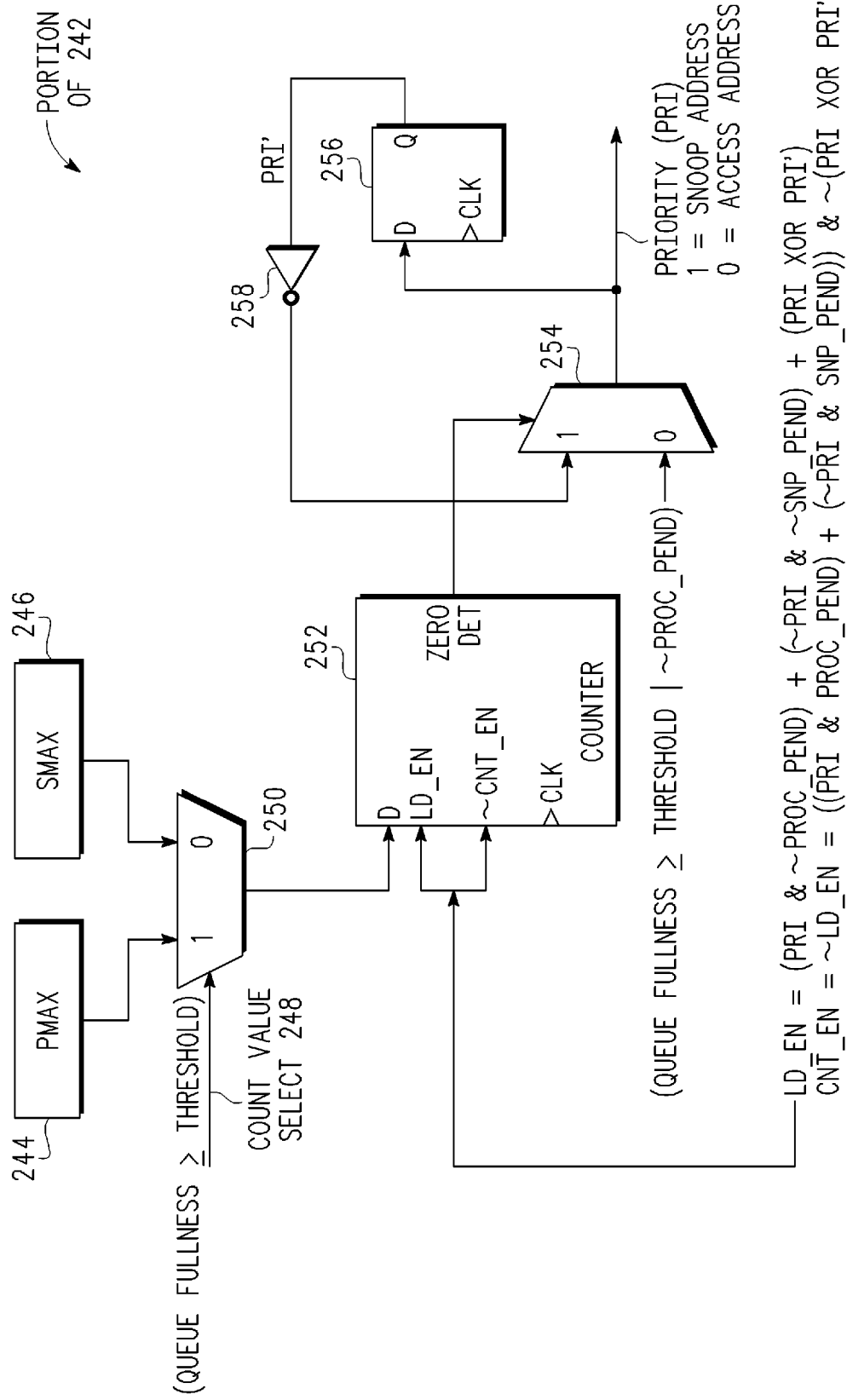
FIG. 7 illustrates a block diagram of a portion of an arbiter which may be used for the arbiter of FIG. 3 in accordance with one embodiment of the present invention.

FIG. 7 illustrates a block diagram of a portion of an arbiter 242 which may be used as arbiter 42 of FIG. 3. That is, arbiter 242 operates the same as arbiter 42 with the addition of the elements illustrated in FIG. 7; therefore, except to the extent described differently in reference to FIGS. 7 and 8, the descriptions provided above with respect to arbiter 42 also apply to arbiter 242. That is, arbiter 242 may be the same as arbiter 42 but with additional capabilities.

As described above in reference to FIGS. 5 and 6, a counter mechanism may be used to help ensure that neither processing circuitry 40 or snoop queue 46 is starved from being able to access cache 28. In the illustrated embodiment of FIG. 7, a single counter, counter 252, may be used to prevent starvation of either processing circuitry 40 or snoop queue 46. In one embodiment, counter 252 counts down (i.e. is decremented) when either an access address from processing circuitry 40 or a snoop address from snoop queue 46 is blocked (i.e. denied access to cache 28). If counter 252 expires, the current priority (indicated again by PRI) is inverted for a predetermined number of cycles to allow the other lower priority requester to access cache 28. In the embodiment described in FIGS. 7 and 8, the current priority is inverted for one cycle (i.e. one access slot). Upon expiration of counter 252, it is reloaded with a value that is dependent on the fullness of snoop queue 46. For example, in one embodiment, counter 252 is reloaded with a counter value selected from one of two values, Pmax and Smax, which may correspond to two effective modalities of snoop traffic. For example, Pmax may be loaded when there are heavy bursts of dense snoop traffic (meaning snoop queue 46 is more full and thus often at or above the fullness threshold), and Smax may be loaded when there is less dense snoop request traffic (such as when the fullness of snoop queue 46 is often below the fullness threshold). Therefore, in one embodiment, when reloading counter 252, a load value is selected between Pmax and Smax based on the fullness of snoop queue 46 in comparison with the fullness threshold. Note that the values of Pmax and Smax provide boundaries, i.e. a floor and a ceiling, on snoop requests throughput during contentions between access address requests from processing circuitry 40 and snoop requests from snoop queue 46. This may therefore ensure that snoop queue 46 does not hold a snoop request for an unbounded time and may likewise ensure that processing circuitry 40 can make forward progress when overloaded with snoop queue traffic requests.

Figure 8:
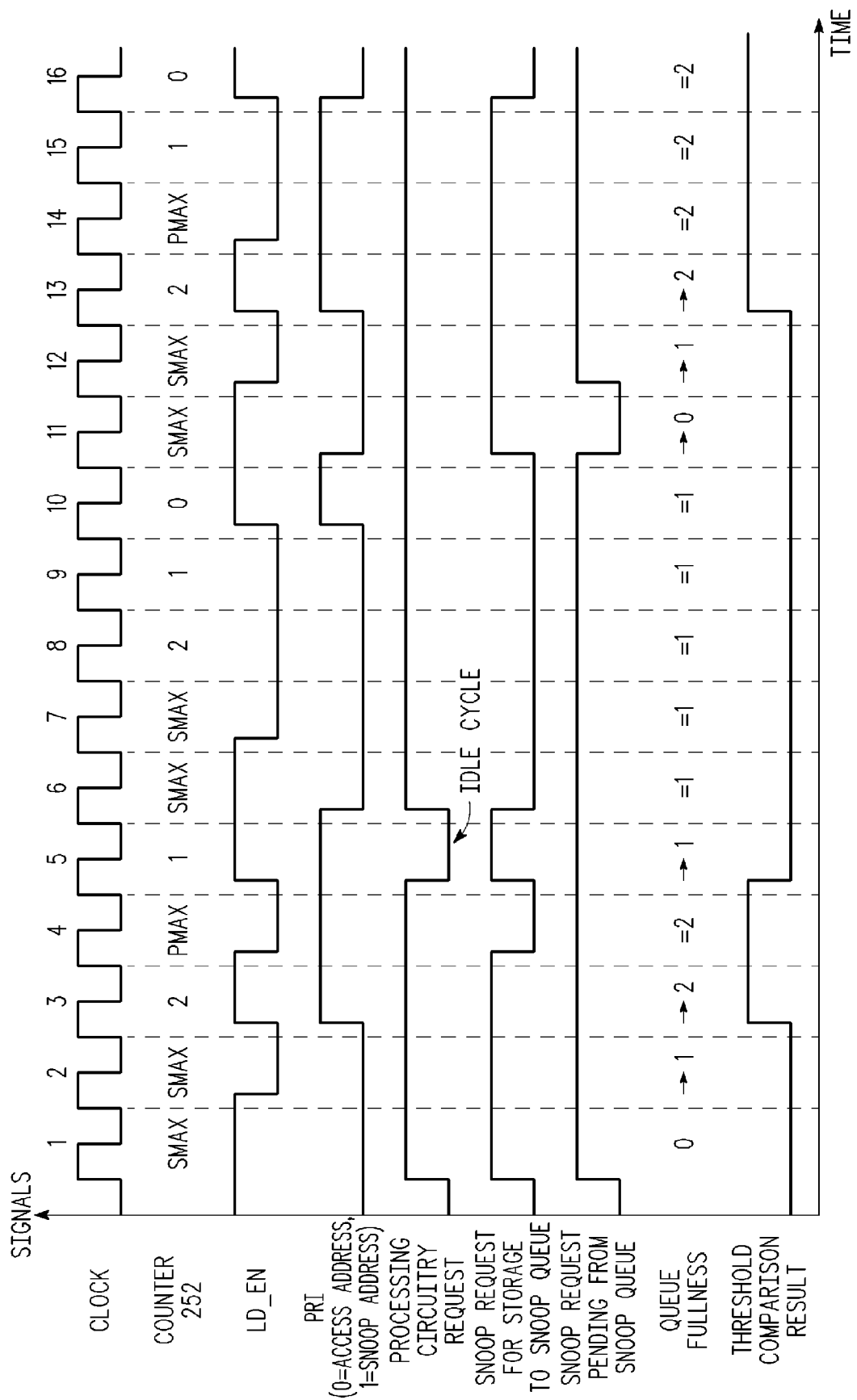
FIG. 8 illustrates a timing diagram according to one embodiment of the present invention.

Note that the values of Pmax and Smax used in the embodiment of FIGS. 7 and 8 can be hardwired values or programmable. In one embodiment, they may be dynamically changed in response to operation of system 10. For example, in one embodiment, based on information provided by system monitor 13, such as performance or throughput information, the values of Pmax or Smax or both can dynamically be changed, in order to achieve a particular system metric, such as latency or throughput.

Illustrated in FIG. 7 is a portion of arbiter 242 in accordance with one embodiment of the present invention. Arbiter 242 includes counter 252, storage circuitry 244 for storing a Pmax value, storage circuitry 246 for storing an Smax value, multiplexers (MUXes) 250 and 254, storage element 256, and inverter 258. A first data input of MUX 250 receives Pmax from storage circuitry 244 and a second data input of MUX 250 receives Smax from storage circuitry 246. A control input of MUX 250 receives a count value select signal 248 which selects one of the two data inputs of MUX 250 to provide at its data output based on whether the fullness of snoop queue 46 is at or above the fullness threshold or not. The data output of MUX 250 is provided as the load value to counter 252 at its data input. The load enable (ld_en) and count enable (cnt_en) inputs of counter 252 will be described in more detail below. A zero detection output of counter 252 (which, when asserted, indicates that counter 252 has expired or reached zero), is provided as the control input of MUX 254. MUX 254 receives an output of inverter 258 at a first data input, and receives an indication of whether "the fullness of snoop queue 46 is at or above the fullness threshold or there is no access address pending" at a second data input, and provides PRI at its data output. The data output of MUX 254 (i.e. the current PRI) is provided to the data input of storage element 256, which, at its output, provides the previous value of PRI, PRI'. PRI' is provided at the input of inverter 258.

Note that, as used herein, a "|" is a logical OR, a "+" is also a logical OR, a "&" is a logical AND, a "~" is a logical NOT, and "!=" indicates "not equal". Note also that "proc_pend", when asserted, indicates that an access address (i.e. a processing circuitry request) from processing circuitry 40 is pending, and "snp_pend", when asserted, indicates than a snoop address (i.e. a snoop request) from snoop queue 46 is pending.

In operation, MUX 250 selects whether Pmax or Smax should be loaded into counter 252 based on whether or not the fullness of snoop queue 46 is at or above the fullness threshold or not. In the illustrated embodiment, count value select 248="queue fullness>=fullness threshold" where MUX 250 selects Pmax when count value select 248 is a logic level 1 (indicating that the queue fullness is at or above the fullness threshold) and selects Smax when count value select 248 is a logic level 0 (indicating that the queue fullness is below the fullness threshold). When counter 252 expires, the first data input of MUX 254 is selected to provide ~PRI', which is the inversion of the previous value of PRI (where the previous value of PRI is indicated as PRI' and was stored in storage element 256). Thus, when counter 252 expires, MUX 254, storage element 256, and inverter 258 operate to invert the priority for one cycle. Once counter 252 is again reloaded with a non-zero value (either Smax or Pmax), the second data input of MUX 254 will be selected as providing PRI. Note that this value of PRI, selected when counter 252 has not expired, can be expressed as "fullness of queue 46>=fullness threshold OR ~proc_pend". When this evaluates to true (i.e. a logic level one in this embodiment), then PRI=1 (which, as was the case with respect to FIGS. 5 and 6, indicates that priority is granted to the snoop address). That is, when the fullness of queue 46 is greater than or equal to the fullness threshold or there is no access address pending from processing circuitry 40, arbiter 242 will grant access to the pending snoop address. Otherwise, PRI=0 and arbiter 242 grants priority to the pending access address from processing circuitry 40.

In the embodiment of FIG. 7, if counter 252 is not counting (e.g. decrementing), then counter 252 is being loaded with a count value, Pmax or Smax, based on the fullness of snoop queue 46. Therefore, for each cycle that counter 252 is not being loaded, it is decrementing. As illustrated in FIG. 7, the load enable equals the inverse of the count enable (ld_en=~cnt_en). In one embodiment, cnt_en=((PRI & proc_pend)|(~PRI & snp_pend)) &~(PRI XOR PRI'). That is, counting is enabled (i.e. cnt_en=1) when a snoop address from snoop queue 46 has priority while there is a pending access address from processing circuitry 40 (i.e. "PRI & proc_pend") or when an access address from processing circuitry 40 has priority while there is a pending snoop address from snoop queue 46 (i.e. "~PRI & snp_pend"), and the priority has not just changed or toggled (i.e. "~(PRI XOR PRI')"). Therefore, counting is enabled when the priority has not changed and arbiter 142 had to resolve a contention by prioritizing an access request from one source over an access request from another source. If the counting is not enabled (i.e. cnt_en=0), such as, for example, when the priority is changing or when there is no contention, then counter 252 is loaded with Pmax or Smax, based on count value select 248 (which is generated based on the fullness of snoop queue 46). Therefore, in one embodiment, ld_en=~cnt_en= (PRI &~proc_pend)|(~PRI &~snp_pend)|(PRI XOR PRI').

Therefore, MUX 254, storage element 256 and inverter 258 allows for priority inversion by monitoring counter 252 to determine when it has expired, and, in response thereto, cause arbiter 242 to invert the priority to select the pending access address for one cycle when a consecutive number of snoop look-up operations exceeds a limit, such as Pmax (even though the queue fullness of snoop queue 46 is at or above the fullness threshold level) or invert the priority to select the pending snoop request for one cycle when a consecutive number of access addresses from processing circuitry 40 being processed exceeds a limit, such as Smax (even though the queue fullness of snoop queue 46 is below the fullness threshold level). In one embodiment, such as when cache operations are pipelined, it may be assumed that each time counter 252 is decremented, either a snoop look-up operation is performed (where the snoop look-up operation is performed in response to the snoop request which was provided to cache 28) or an access address is processed (where the access address is processed by being provided to cache 28). Therefore, in one embodiment, Pmax may represent the maximum number of cycles that processing circuitry 40 is to be denied access to cache 28, and Smax may represent the maximum number of cycles that snoop queue 46 is to be denied access to cache 28.

Therefore, in the embodiment of FIG. 7, by loading counter 252 with Pmax or Smax based on the fullness of snoop queue 46, a single counter 252 may be used to ensure that neither requester is starved. In one embodiment, note that by selecting Pmax to have a value of 1 and Smax to have a value of 0, a round robin effect results for granting priority between access addresses and snoop addresses.

FIG. 8 illustrates a timing diagram which describes operation of a portion of FIG. 3 along with the portion of arbiter 242 of FIG. 7 in accordance with one embodiment. In FIG. 8, it is assumed that Smax has a value of 3, Pmax has a value of 2, and the fullness threshold has a value of 2. In cycle 1, since the fullness of snoop queue 46 is 0 (which is less than the fullness threshold of 2, as indicated by the negation of the "threshold comparison result"), counter 252 is loaded with the value of Smax (where ld_en is asserted in cycle 1). Also, in cycle 1 there is a pending processing circuitry 40 request. Therefore, PRI is negated to indicate that priority is granted to the pending access address since the queue fullness is below the fullness threshold and no starvation-preventing priority inversion occurs (since counter 252 has not expired).

In cycle 2, the queue fullness transitions (indicated by "→") to 1 due to a snoop request which was received for storage into snoop queue 46 in cycle 1 (such as from cache coherency manager 18), as indicated by the assertion of "snoop request for storage to snoop queue" in cycle 1. Counter 252 is reloaded with the value of Smax at the beginning of cycle 2. PRI remains negated to grant priority to the next pending access address (whose existence is indicated by the processing circuitry request remaining asserted in cycle 2). Since snoop queue 46 was again denied access to cache 28 (since PRI remained negated), ld_en is negated in cycle 2 (thus, cnt_en is asserted, which is not shown in FIG. 8, since it is simply the inverse of ld_en). Therefore, counter 252 is enabled to decrement from the 3 (Smax) to 2 at the beginning of cycle 3.

In cycle 3, the queue fullness transitions to 2 due to the snoop request for storage to snoop queue 46 received in cycle 2. Therefore, in cycle 3, the queue fullness is at or above the fullness threshold of 2. Therefore, PRI is asserted to grant priority to the snoop address (i.e. the snoop request pending from snoop queue 46), in accordance with the lazy snoop protocol described above. Counter 252 is decremented at the beginning of cycle 3 to a value of 2 since a snoop queue request is still pending and an access request was performed to cache 28 in cycle 3. Also, since this is a first cycle during which a pending access address is denied priority to cache 28, counter 252 is enabled to be reloaded at the beginning of cycle 4. In cycle 4, it is reloaded with Pmax rather than Smax since the queue fullness is now at or above the fullness threshold (as indicated by assertion of the threshold comparison result).

In cycle 4, the queue fullness remains at or above the fullness threshold (due to another incoming snoop request for storage into snoop queue 46 received in cycle 3). Ld_en is negated since processing circuitry 40 is again denied access to cache 28 (since PRI is asserted), thus counter 252 will be decremented from 2 (Pmax) to 1 at the beginning of cycle 5. Since counter 252 has not expired, PRI remains asserted to grant priority to the snoop address. In cycle 5, the processing circuitry request is negated, indicating that there is no pending access address to be processed. Thus, cycle 5 is considered an idle request cycle from processing circuitry 40. PRI remains asserted in cycle 5, and counter 252 is enabled to be loaded at the beginning of cycle 6 since there is no access request from processing circuitry 40, and PRI remains asserted. Also, in cycle 5, no new snoop request for storage into snoop queue was received in cycle 5 and a snoop request pending from snoop queue was processed in cycle 5, thus the queue fullness transitions down to 1, which is below the threshold. However, even though the queue fullness in cycle 5 is less than the fullness threshold, due to the idle cycle, PRI remains asserted, in accordance with the lazy snoop protocol described above. Since the threshold is not exceeded, Smax is selected to be loaded into the counter at the beginning of cycle 6.

In cycle 6, the queue fullness remains at 1 due to the additional snoop request for storage into snoop queue 46 received in cycle 5 and due to a snoop request being processing in cycle 5. However, in cycle 6 there is again a pending access address (i.e. processing circuitry request is again asserted), thus PRI is negated to grant priority to the pending access address. Also in cycle 6, since priority was granted to the pending access address and the queue fullness is less than the fullness threshold, counter 252 is loaded with Smax. In each of cycles 7-9, PRI remains negated to consecutively grant priority to the pending access addresses, thus denying access to cache 28 by snoop queue 46. Also, no additional snoop requests for storage to snoop queue 46 are received such that the queue fullness remains at 1 in each of cycles 7-9. In cycle 10, since PRI was continuously negated through cycle 9 thus denying snoop queue 46 access to cache 28, counter 252 expired, indicated an Smax number of consecutive cycles (i.e. consecutive access address grants from processing circuitry 40) occurred. Therefore, even though the queue fullness remains below the fullness threshold, priority is inverted for one cycle due to the expiration of counter 252. Therefore, in cycle 10, PRI is asserted for one cycle to grant priority to a pending snoop request from snoop queue 46. This starvation-preventing priority inversion pre-empts the pending processing circuitry request. Since the priority is changed (PRI !=PRI'), the counter will be reloaded at the beginning of cycle 11, and Smax is chosen as the reload value since the threshold is not met by the snoop queue fullness.

In cycle 11, the fullness of snoop queue 46 transitions to 0. Also in cycle 11, PRI is again negated to revert priority back to the pending access address and counter 252 is enabled to be reloaded with Smax again (since there is no snoop request pending) at the beginning of cycle 12.

In cycle 12, the queue fullness transitions to 1 due to the snoop request for storage into snoop queue 46 received in cycle 11. However, PRI remains negated since the queue fullness is still below the fullness threshold (as indicated by the negated threshold comparison result). At the beginning of cycle 12, counter 252 is being reloaded with Smax, since there is no snoop request pending.

In cycle 13, the queue fullness transition to 2 due to the snoop request for storage into snoop queue 46 received in cycle 12, and thus, since a queue fullness of 2 is at or above the fullness threshold, PRI is asserted to grant priority to the snoop address (to the snoop request pending from snoop queue 46). In this case, since cycle 13 is a first cycle in which the pending access address from processing circuitry 40 is denied access to cache 28 and the queue fullness is at or above the fullness threshold (indicated by the assertion of the threshold comparison result), counter 252 will be loaded with Pmax at the beginning of cycle 14. In each of cycles 14 and 15, the queue fullness remains at 2 (which is at or above the fullness threshold), and thus PRI remains asserted giving priority to the snoop requests. Also, in cycle 15, counter 252 is decremented.

In cycle 16, counter 252 expires, therefore, PRI is negated for one cycle to grant priority to a pending access address from processing circuitry 40, even though the queue fullness remains at or above the fullness threshold. This starvation-preventing priority inversion pre-empts the pending snoop request from snoop queue 46. After cycle 16 (not shown), PRI is again asserted to revert priority back to the pending snoop request and counter 252 is reloaded with Pmax again (since the queue fullness is still at or above the fullness threshold).

Therefore, note that each time the priority is changed due to the lazy protocol (other than due to the starvation-preventing priority inversions, which is one reason why ld_en includes the term "PRI XOR PRI'"), counter 252 is again reloaded with either Smax or Pmax, based on the fullness of snoop queue 46. When counter 252 expires, priority inversion is performed for one cycle (or more cycles, in alternate embodiments) in order to prevent starvation. In this case, upon reverting priority back to the previous priority, counter 252 is also reloaded to begin the count down again. Note that when priority is granted to pending snoop requests from snoop queue 46 due to the lazy protocol (because the queue fullness is at or above the fullness threshold or there is an idle cycle), counter 252 is loaded with Pmax and counts the number of cycles that processing circuitry 40 is denied access to cache 28 (i.e. in order to count the number of consecutive snoop look-up operations performed) such that processing circuitry 40 is not continuously starved. However, when priority is granted to pending access addresses from processing circuitry 40 due to the lazy protocol (because the queue fullness is below the fullness threshold), counter 252 is loaded with Smax and counts the number of cycles that snoop queue 46 is denied access to cache 28 (i.e. in order to count the number of consecutive access addresses that are processed) such that snoop queue 46 is not continuously starved. In one embodiment, note that Pmax is less than Smax such that processing circuitry 40 is guaranteed to be starved less than snoop queue 46. Also, in an alternate embodiment, note that the starvation-preventing priority inversion can be performed for more than one cycle or can be performed for a different number of cycles depending on which requestor the priority is inverting to.

Because the various apparatus implementing the present invention are, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary memory system architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 10 is implemented in a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, any type of memory cache, synchronous or asynchronous, may be used. Various types of memory circuits including dynamic random access memory (DRAM), synchronous random access memory (SRAM), magnetoresistive random access memory (MRAM), FLASH, shift registers and addressable storage registers may be used to implement the cache. Various system interconnect or bus protocols could be implemented. In other embodiments system components in addition to those used in FIG. 1 may be provided. It should be understood that all circuitry described herein may be implemented either in silicon or another semiconductor material or alternatively by software code representation of silicon or another semiconductor material. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. Accordingly, the specification and figures are to be regarded in an illustrative rather than a restrictive sense, and all such modifications are intended to be included within the scope of the present invention.

The following are various embodiments of the present invention.

Item 1 includes a method of performing a snoop look-up operation in a system having a first cache and a first processor, wherein the first processor generates requests to the first cache for data. The method includes loading a snoop queue with snoop requests, wherein a fullness of the snoop queue is a measure of how many snoop requests are in the snoop queue; determining if the fullness of the snoop queue exceeds a predetermined threshold; performing a snoop look-up operation in the first cache if the fullness of the snoop queue exceeds the predetermined threshold, wherein the snoop look-up operation is based on a snoop request from the snoop queue corresponding to an entry in the snoop queue; and if the fullness of the snoop queue does not exceed the predetermined threshold and there is at least one snoop request in the snoop queue, waiting to perform a snoop look-up operation until an idle access request cycle from the first processor to the first cache occurs, and performing the snoop look-up operation in the first cache upon the idle access request cycle from the first processor. Item 2 includes the method of item 1, wherein the step of loading is further characterized by the snoop requests arising from possible incoherencies, and the method further includes detecting possible incoherencies caused by at least one transaction between a second processor and a main memory or between the second processor and a second cache. Item 3 includes the method of item 2, wherein the step of detecting possible incoherencies is further characterized by using a coherency manager coupled to a system interconnect, and wherein the second processor and the main memory are coupled to the system interconnect. Item 4 includes the method of item 1 and further includes comprising informing a snoop control circuit of a result arising from performing the snoop look-up operation, wherein the snoop control circuit is part of the first processor or the first cache. Item 5 includes the method of item 1, wherein the step of performing the snoop look-up operation in the first cache includes determining if there is a hit in the first cache; if there is a hit in the first cache, setting a bit in a line in the first cache to indicate an invalid entry in the line in the first cache; and if there is not a hit in the first cache, not changing the first cache.

Item 6 includes the method of item 1 and further includes changing the predetermined threshold in response to a signal. Item 7 includes the method of item 1, wherein the step of loading the snoop queue is further characterized by the snoop queue being within the first processor. Item 8 includes the method of item 1, and further includes removing an entry corresponding to the snoop request for which the snoop look-up operation was performed from the snoop queue.

Item 9 includes a system which includes a first processing unit; a first cache coupled to the first processing unit; an arbiter coupled to the first cache and the first processing unit; a snoop queue coupled to the arbiter that stores snoop requests and provides an output indicating a fullness of the snoop queue; and a snoop control circuit coupled to the snoop queue that provides snoop requests to the snoop queue. The arbiter compares the output indicating the fullness of the snoop queue, detects if the first processing unit is performing an idle cycle or an active cycle with the first cache, performs a snoop look-up operation in the first cache if the fullness of the snoop queue exceeds a threshold, and if the fullness of the snoop queue does not exceed the threshold and there is at least one snoop request in the snoop queue, waiting to perform the snoop look-up operation until an idle access request cycle from the first processor to the first cache occurs, and performing the snoop look-up operation in the first cache upon the idle access request cycle from the first processing unit. Item 10 includes the system of item 9 and further includes a second processing unit; a second cache coupled to the second processing unit, wherein transactions between the second processing unit and the second cache cause possible incoherencies with the first cache; and a cache coherency manager coupled to the snoop control circuit and the second processing unit that detects the possible incoherencies and communicates the possible incoherencies to the snoop control circuit. Item 11 includes the system of item 10 wherein the snoop control circuit provides snoop requests in response to the possible incoherencies detected by the cache coherency manager. Item 12 includes the system of item 10, and further includes a system interconnect coupled to the first processing unit, the second processing unit, and the cache coherency manager. Item 13 includes the system of item 9, wherein the threshold of the arbiter is selectable. Item 14 includes the system of item 9, wherein the arbiter comprises threshold control logic that compares the fullness to the threshold. Item 15 includes the system of item 14, wherein the threshold control logic is further characterized by the threshold being programmable. Item 16 includes the system of item 9, wherein the snoop queue is further characterized as reducing its fullness when the arbiter performs a snoop look-up operation and increases its fullness when receiving a snoop request.

Item 17 includes a method for performing a snoop look-up operation in a cache in response to a snoop request which includes detecting a request between a processor and a cache; performing the snoop look-up operation if the request is an idle request; and not performing the snoop look-up operation if the request is an access request and then performing the snoop look-up operation if a next request between the processor and the cache is an idle request. Item 18 includes the method of item 17, wherein the step of not performing the snoop look-up operation is further characterized as performing the snoop look-up operation if a predetermined number of snoop requests accumulate. Item 19 includes the method of item 18, wherein the step of not performing the snoop look-up operation is further characterized by the predetermined number being programmable. Item 20 includes the method of item 17, and further includes causing the snoop request by a second processor performing a write to a memory.

What is claimed is:

1. A method of performing a snoop look-up operation in a system having a first cache and a first processor, wherein the first processor generates requests to the first cache for data, comprising:
    loading a snoop queue with snoop requests, wherein a fullness of the snoop queue is a measure of how many snoop requests are in the snoop queue;
    determining if the fullness of the snoop queue exceeds a predetermined threshold;
    performing a snoop look-up operation in the first cache if the fullness of the snoop queue exceeds the predetermined threshold, wherein the snoop look-up operation is based on a snoop request from the snoop queue corresponding to an entry in the snoop queue; and
    if the fullness of the snoop queue does not exceed the predetermined threshold and there is at least one snoop request in the snoop queue,
        waiting to perform a snoop look-up operation until an idle access request cycle from the first processor to the first cache occurs; and
        performing the snoop look-up operation in the first cache upon the idle access request cycle from the first processor.

2. The method of claim 1, wherein the step of loading is further characterized by the snoop requests arising from possible incoherencies, the method further comprising detecting possible incoherencies caused by at least one transaction between a second processor and a main memory or between the second processor and a second cache.

3. The method of claim 2, wherein the step of detecting possible incoherencies is further characterized by using a coherency manager coupled to a system interconnect, wherein the second processor and the main memory are coupled to the system interconnect.

4. The method of claim 1, further comprising informing a snoop control circuit of a result arising from performing the snoop look-up operation, wherein the snoop control circuit is part of the first processor or the first cache.

5. The method of claim 1, wherein the step of performing the snoop look-up operation in the first cache, comprises:
    determining if there is a hit in the first cache;
    if there is a hit in the first cache, setting a bit in a line in the first cache to indicate an invalid entry in the line in the first cache; and
    if there is not a hit in the first cache, not changing the first cache.

6. The method of claim 1, further comprising:
    changing the predetermined threshold in response to a signal.

7. The method of claim 1, wherein the step of loading the snoop queue is further characterized by the snoop queue being within the first processor.

8. The method of claim 1, further comprising removing an entry corresponding to the snoop request for which the snoop look-up operation was performed from the snoop queue.

9. A system comprising,
    a first processing unit;
    a first cache coupled to the first processing unit;
    an arbiter coupled to the first cache and the first processing unit;
    a snoop queue coupled to the arbiter that stores snoop requests and provides an output indicating a fullness of the snoop queue; and
    a snoop control circuit coupled to the snoop queue that provides snoop requests to the snoop queue; wherein the arbiter compares the output indicating the fullness of the snoop queue, detects if the first processing unit is performing an idle cycle or an active cycle with the first cache, performs a snoop look-up operation in the first cache if the fullness of the snoop queue exceeds a threshold, and if the fullness of the snoop queue does not exceed the threshold and there is at least one snoop request in the snoop queue, waiting to perform the snoop look-up operation until an idle access request cycle from the first processor to the first cache occurs; and performing the snoop look-up operation in the first cache upon the idle access request cycle from the first processing unit.

10. The system of claim 9, further comprising:
a second processing unit;
a second cache coupled to the second processing unit, wherein transactions between the second processing unit and the second cache cause possible incoherencies with the first cache; and
a cache coherency manager coupled to the snoop control circuit and the second processing unit that detects the possible incoherencies and communicates the possible incoherencies to the snoop control circuit.

11. The system of claim 10, wherein the snoop control circuit provides snoop requests in response to the possible incoherencies detected by the cache coherency manager.

12. The system of claim 10, further comprising a system interconnect coupled to the first processing unit, the second processing unit, and the cache coherency manager.

13. The system of claim 9, wherein the threshold of the arbiter is selectable.

14. The system of claim 9, wherein the arbiter comprises threshold control logic that compares the fullness to the threshold.

15. The system of claim 14, wherein the threshold control logic is further characterized by the threshold being programmable.

16. The system of claim 9, wherein the snoop queue is further characterized as reducing its fullness when the arbiter performs a snoop look-up operation and increases its fullness when receiving a snoop request.

* * * * *